March 10, 1936.　　W. W. KRAUTER, JR　　2,033,431
DANDELION AND WEED PICKER
Filed April 5, 1935　　2 Sheets-Sheet 1
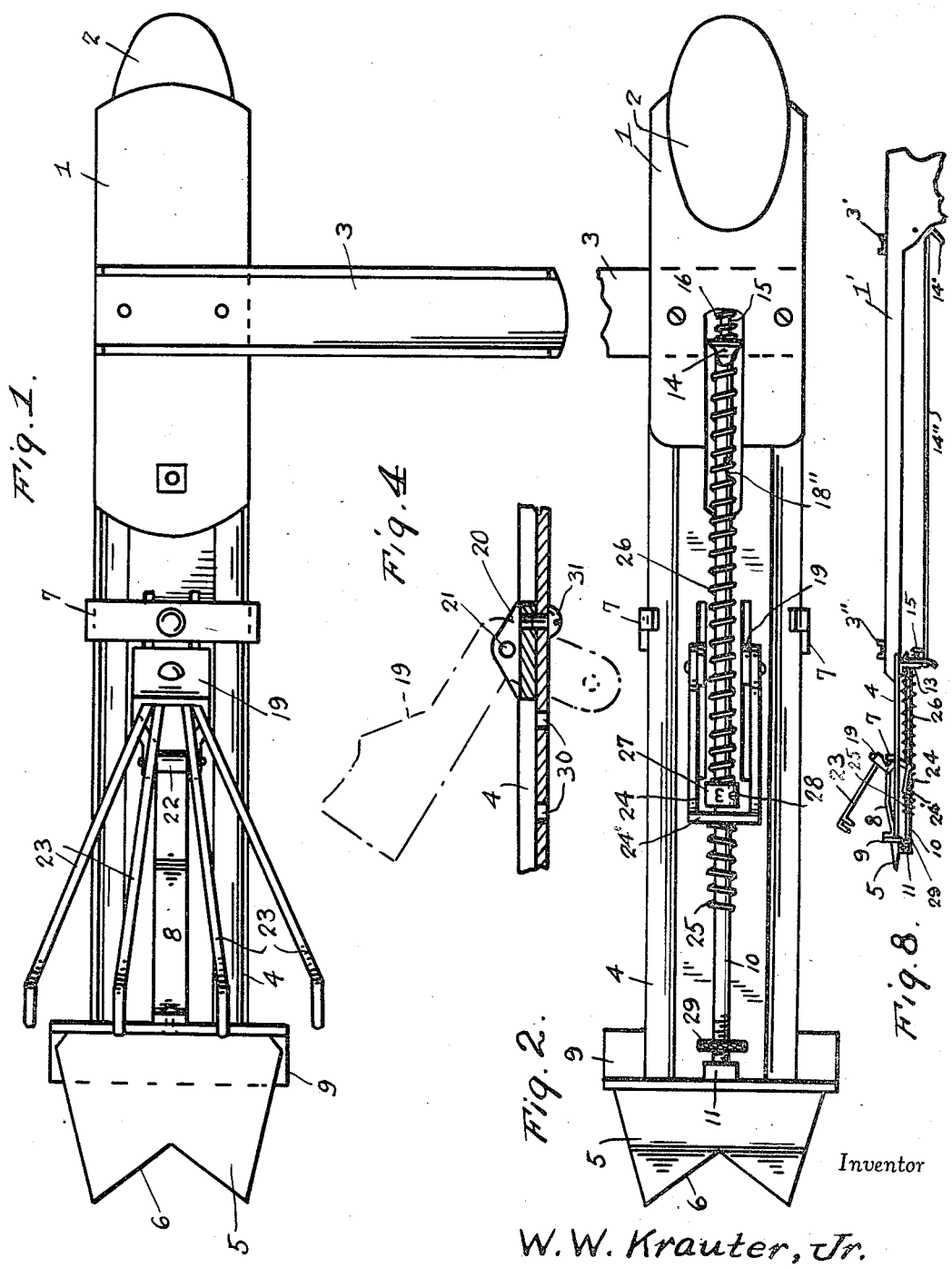
Inventor
W. W. Krauter, Jr.
By Clarence A. O'Brien
Attorney

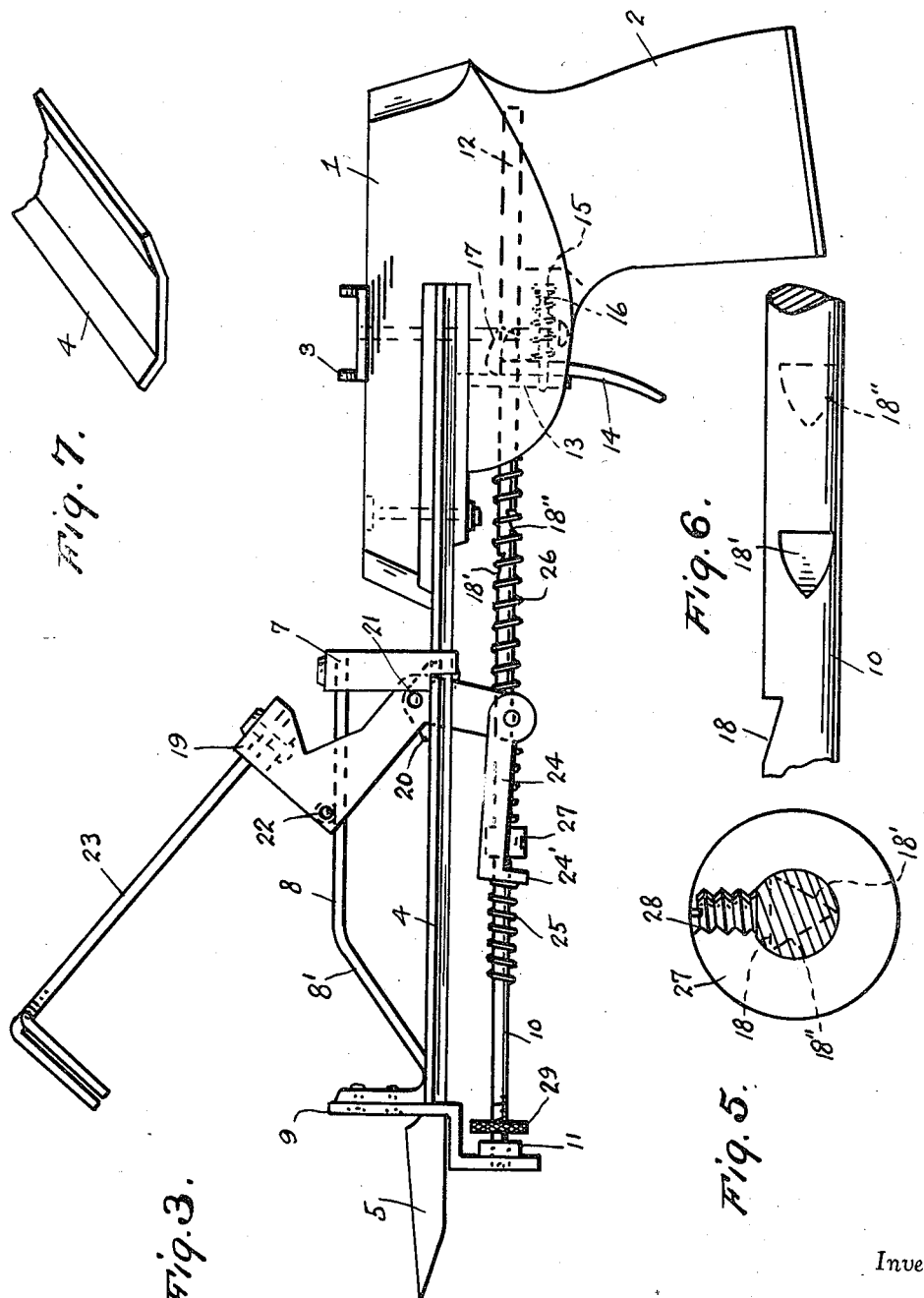

Patented Mar. 10, 1936

2,033,431

UNITED STATES PATENT OFFICE 2,033,431

DANDELION AND WEED PICKER

William W. Krauter, Jr., Cortland, Nebr.

Application April 5, 1935, Serial No. 14,905

5 Claims. (Cl. 55—148)

This invention relates to a device for removing dandelion, weeds and the like from lawns and other places, the general object of the invention being to provide a device of this nature in which the user can quickly and easily remove dandelion and the like with the least possible effort and minimum amount of time, with means whereby the device can be readily adjusted for use on different sizes of plants and one which will not mar the lawn in removing the weeds or dandelion therefrom.

This invention also consists in certain other features of construction and in the combination and arrangement of several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a front view of the device.

Figure 2 is a rear view thereof.

Figure 3 is an elevation of the device.

Figure 4 is a fragmentary longitudinal sectional view showing how the claw assembly can be adjusted on the shank.

Figure 5 is a transverse sectional view through the rod showing how the collar is secured thereto.

Figure 6 is a fragmentary view showing the notched part of the rod.

Figure 7 is a fragmentary perspective view of the shank.

Figure 8 is an elevation showing the device provided with a long handle.

In these drawings the handle is shown at 1 and it is preferably provided with the pistol grip 2 and this handle may be of the short length as shown in Figures 1, 2 and 3 or of long length as shown at 1' in Figure 8. The short handle is formed with a transversely extending hand grip 3 and the long handle is provided with a similar grip 3' and also a foot rest 3'' as shown in Figure 8.

A shank 4 of slightly channel-shape, as shown in Figure 7, has one end thereof fastened to the handle, the blade 5 being connected to the other end and this blade has a V-shaped recess 6 in its cutting edge and the blade is also of curved shape in cross section with its rear part forming a shoulder where it joins the shank.

A block or post 7 has one end slidably connected with the shank and a track forming bar 8 is connected with the other end, the rear part of this bar being straight and the front part sloping downwardly and forwardly to the shank as shown at 8' with its forward end turned at right angles and fastened to a substantially Z-shaped part 9 which has an opening at an intermediate part for slidingly receiving the shank. When this part 9 abuts the shoulder at the rear end of the blade it is stopped of further movement. A rod 10 has its front end threaded and passes through a hole in the rear portion of the part 9 and this end of the rod is held in adjusted position by a lock nut 11 which can be turned when the lock nut is loosened by a screw driver or the like placed in the kerf in the front end of the rod as shown in Figure 3. The rear end of the rod slides in a bore 12 formed in the handle and through a hole formed in a bracket 13 carried by the handle to which a trigger 14 is yieldingly connected by a rod 15 passing through a hole in the trigger and fastened to the bracket, with a spring 16 encircling the rod and bearing against the trigger. The upper end of the trigger has an outwardly and downwardly sloping part 17 for engaging a notch 18 in the rod 10.

A substantially yoke-shaped member 19 has the intermediate parts of its limbs pivoted to a bracket 20 as shown at 21 and the limbs of said yoke are of the shape shown more particularly in Figure 3, with a roll 22 carried by the forward portion of the yoke for engaging the track member 8. A plurality of claw forming prongs 23 are connected to the upper bight forming part of the yoke, each prong including a substantially straight shank with its free end bent downwardly at right angles and these parts are preferably arranged as shown in Figure 1. The depending portions of the limbs of the yoke which extend downwardly beyond the pivot 21 have pivoted thereto a member 24 which has a depending forked end 24' for fitting over the rod 10. A short light spring 25 encircles the rod 10 in front of the part 24' and a long spring 26 encircles the rod and has its front end bearing against a collar 27 connected with the rod 10 by a set screw 28, see Figure 5, with the rear end of the spring engaging a part of the handle. A knurled nut 29 is threaded on the front end of the rod and acts as an adjustable stop or projection for engaging the front end of the spring 25 when the parts are moved toward the handle.

When a weed, dandelion or the like is to be removed from a lawn or the like the blade is pressed into the ground at the roots of the dandelion or weed and as this is done the engagement of the ground by the part 9 will shove this part toward the handle and this results in the track 8, the block 7 and the rod 10 moving toward the handle and when the sloping part 8' of the track comes under the roller 22 the yoke 19 and the claws 23 will drop so that the bent ends of the claws will engage the plant and hold it against the top part of the blade where it joins the shank. The rearward movement of these parts will cause the nut 29 to compress the spring against the part 24' of the member 24 and the tension placed against the member 24 will cause the yoke and the claws to remain in position with the claws firmly holding the top part of the plant against the blade. As the spring 25 is light the claws will automatically adjust themselves to the size of the plant engaged by the claws. The rearward movement of the rod 10 will bring notch 18 under the part 17 of the trigger so that this part 17 will engage the notch and hold the rod in retracted position with the spring 26 compressed. The device is then moved to pull the blade out of the ground and the claws will hold the plant against the blade so that the plant will be removed with the device. Then the blade end of the device is held close to a receptacle with the plant therebetween and the trigger 14 is pulled upon to release the rod and as this is done the spring 26 will forcibly project the parts forwardly so that the plant is shot into the receptacle. As the parts move forwardly with the action of the spring 26 the part 8' of the track will raise the yoke by its engagement with the roller 22 so that the claws are lifted so that the member 9 can pass the claws and throw the plant off the blade into the receptacle.

In order to adjust the device for use with different sizes of plants, it being understood that the blade should penetrate the ground deeper with large size plants than with smaller size plants, I make the bracket 20 adjustable by providing a plurality of holes 30 in the shank 4 for receiving the screws 31 which hold the bracket to the same and I also provide other notches 18' and 18" in the rod 10 for engagement by the trigger. In order to facilitate the adjustment of the device I prefer to number the shank adjacent the holes 30 so as to indicate the different adjustments at which the bracket can be set and I also place numerals on the collar 27 which are the same as those on the shank and the numerals on the collar 27 will indicate which notch in the rod 20 is in operating position for engagement by the trigger. For instance if the device is to be set for an intermediate adjustment which might be numbered 2 the bracket 20 is placed at the place marked 2 on the shank and then the lock nut is loosened and the rod 10 turned by a screw driver inserted in the kerf at its front end and the rod 10 turned until number 2 appears in the proper position on the collar and when this is done the second notch will be in position to be engaged by the trigger. This collar 27 also provides means for adjusting the tension of the spring 26 and the trigger spring can be adjusted by turning the screw 15.

The drawings have the device provided with three adjustments for three different depths that it may be shoved into the ground to cut the roots of the weed or dandelion. The larger the size of the dandelion or weed the deeper must be the adjustment.

This device picks up the plants automatically and there are no levers to work for as the blade is pulled from the ground the claws will grab the plant and hold it in place until the trigger is pressed upon and when this is done the plant is shot into the basket or receptacle. The device will not dig up the lawn as it is pulled out in the same direction it is inserted and the V-shaped recess in the cutting edge will prevent the blade from slipping to one side or the other of the roots and the curve in the blade adds strength to it.

When the long handle is used a trigger 14' may be used which is connected to the trigger 14 by a link 14" as shown in Figure 8.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:—

1. A device of the class described comprising a handle, a shank connected with the handle, a blade at the free end of the shank, a member slidably arranged on the shank and including a track portion having a straight rear portion and a front portion sloping forwardly and toward the shank, a rod connected with the front end of the sliding part and the handle having a bore therein for slidingly receiving a portion of the rod, a claw carrying member pivoted to the shank and having a part extending from the pivot to a point adjacent the rod, a member pivoted to the extremity of said last-mentioned part and provided with a portion fitting over the rod, claws carried by the claw carrying member and said claw carrying member having a roller engaging the track, a spring on the rod for applying pressure to the claw carrying member to hold the claws in clamping engagement with a plant engaged by the blade when the sliding member is pushed back by engagement of the ground after the blade is inserted in the ground, a trigger for holding the parts in retracted position and a spring on the rod for projecting the parts when the trigger is moved to releasing position.

2. A device of the class described comprising a handle, a shank connected with the handle, a blade at the free end of the shank, a sliding member on the shank including a ground engaging part normally located at the rear end of the blade, a track part having its front portion sloping toward the shank, a claw carrying member pivotally connected with the shank and carrying a roller for engaging the track, claws carried by the front portion of the claw carrying member, said member moving the claws to grip a plant against the blade when the sliding member moves to a position where the roller will engage the sloping part of the track, spring means placed under tension by the rearward movement of the sliding member for applying pressure to the claws and trigger means for holding the parts in retracted position and other spring means for projecting the parts when the trigger means is released.

3. A device of the class described comprising a handle, a shank connected with the handle, a blade connected with the free end of the shank and of curve shape in cross section and having a V-shaped recess in its cutting edge, a member slidably arranged on the shank and including a post, a forwardly extending track having one end connected with the post and having its front end sloping toward the shank and a ground engaging member connected with the forward end of the track, a rod connected with the ground engaging member and located at the rear of the shank, the handle having a bore receiving the other end of the rod, a yoke pivoted to the shank, claws carried by the yoke, a roller carried by the yoke for engaging the track, said yoke having a rearwardly extending portion, a member pivoted thereto and having a portion fitting over the rod, a light spring on the rod engaging the last-mentioned member, a projection on the front end of the rod for tensioning the spring when the sliding member moves rearwardly, a collar on the rod, a second spring on the rod having its front end engaging the collar and its rear end a part of the handle, said rod having a notch therein, a trigger member for engaging the notch for holding the parts retracted, the last-mentioned spring contracted, said spring projecting the parts when the trigger is released.

4. A device of the class described comprising a handle, a shank connected with the handle, a blade connected with the free end of the shank and of curve shape in cross section and having a V-shaped recess in its cutting edge, a member slidably arranged on the shank and including a post, a forwardly extending track having one end connected with the post and having its front end sloping toward the shank and a ground engaging member connected with the forward end of the track, a rod connected with the ground engaging member and located at the rear of the shank, the handle having a bore receiving the other end of the rod, a yoke pivoted to the shank, claws carried by the yoke, a roller carried by the yoke for engaging the track, said yoke having a rearwardly extending portion, a member pivoted thereto and having a portion fitting over the rod, a light spring on the rod engaging the last-mentioned member, a projection on the front end of the rod for tensioning the spring when the sliding member moves rearwardly, a collar on the rod, a second spring on the rod having its front end engaging the collar and its rear end a part of the handle, said rod having a notch therein, a trigger member for engaging the notch for holding the parts retracted, the last-mentioned spring contracted, said spring projecting the parts when the trigger is released, means for adjusting the pivotal point of the yoke and said rod having other trigger engaging notches therein out of alignment with each other and the first notch and means for adjusting the rod to bring different notches into operative position and in accordance with the adjustment made to the pivotal point of the yoke.

5. A device of the class described, comprising a shank, a blade on the shank, a sliding member on the shank including a ground engaging part normally located at the rear end of the blade, a track part having its front portion sloping towards the shank, a claw carrying member pivotally connected with the shank and carrying a roller for engaging the track, claws carried by the front portion of the claw carrying member, said member moving the claws to grip a plant against the blade when the sliding member moves to a position where the roller will engage the sloping part of the track, and means for operating the sliding member.

WILLIAM W. KRAUTER, Jr.